(12) United States Patent
Fujiwara et al.

(10) Patent No.: US 8,015,656 B2
(45) Date of Patent: Sep. 13, 2011

(54) WIPER BLADE

(75) Inventors: Masaru Fujiwara, Kiryu (JP); Ken Machida, Kiryu (JP); Tsuneo Sugiyama, Kiryu (JP)

(73) Assignee: MITSUBA Corporation, Kiryu-shi (JP)

( * ) Notice: Subject to any disclaimer, the term of this patent is extended or adjusted under 35 U.S.C. 154(b) by 844 days.

(21) Appl. No.: 12/038,204

(22) Filed: Feb. 27, 2008

(65) Prior Publication Data
US 2008/0201892 A1 Aug. 28, 2008

(30) Foreign Application Priority Data

Feb. 28, 2007 (JP) ................................. 2007-050655
Feb. 28, 2007 (JP) ................................. 2007-050656

(51) Int. Cl.
*B60S 1/40* (2006.01)
(52) U.S. Cl. .................... 15/250.32; 15/250.43
(58) Field of Classification Search ................ 15/250.32, 15/250.351, 250.43, 250.44
See application file for complete search history.

(56) References Cited

U.S. PATENT DOCUMENTS

| 3,576,044 | A | | 4/1971 | Besnard | |
|---|---|---|---|---|---|
| 4,348,782 | A | * | 9/1982 | Fournier | 15/250.32 |
| 4,445,249 | A | * | 5/1984 | Harbison et al. | 15/250.32 |
| 6,353,962 | B1 | * | 3/2002 | Matsumoto et al. | 15/250.32 |
| 6,594,854 | B1 | | 7/2003 | Matsumoto et al. | |
| 2004/0123414 | A1 | | 7/2004 | Lee | |

FOREIGN PATENT DOCUMENTS

| DE | 2829437 A1 | 1/1980 |
|---|---|---|
| FR | 2190078 A5 | 1/1974 |
| JP | 2-129952 | 10/1990 |
| JP | 2005075050 A | 3/2005 |
| JP | 2006096196 A | 4/2006 |

OTHER PUBLICATIONS

See the European Search Report dated Jul. 19, 2010 for Serial No. EP 08 29 0194.

* cited by examiner

*Primary Examiner* — Gary K Graham
(74) *Attorney, Agent, or Firm* — McCormick, Paulding & Huber LLP

(57) ABSTRACT

Rotation of a tip side of a blade holder toward a windshield at or beyond a predetermined angle is regulated with respect to a wiper arm. A convex portion is formed at a portion of the blade holder opposing to an arm mounting member, and a concave portion is formed at a portion of the arm mounting member opposing to the blade holder, whereby engagement of the convex and concave portions admits rotation of a tip side of the wiper blade toward the windshield at or beyond a predetermined angle to be regulated with respect to the wiper arm. By such a structure, since contact between the wiper arm and the wiper blade is prevented, it is suppressed that a coating of the wiper arm or blade holder is peeled off to bring early its rusty, and that damages of both members make their wiping performance easily deteriorate.

3 Claims, 11 Drawing Sheets

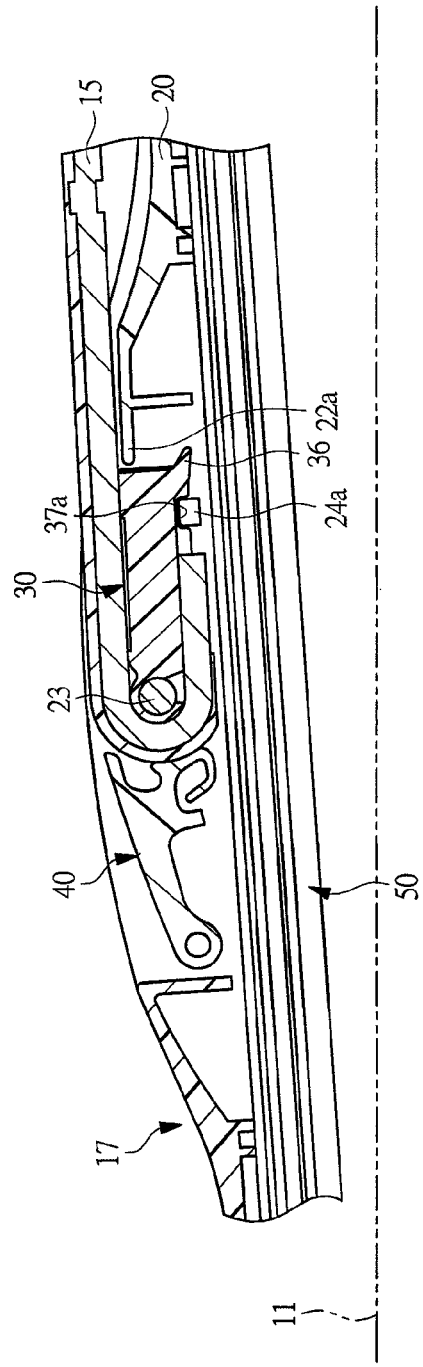
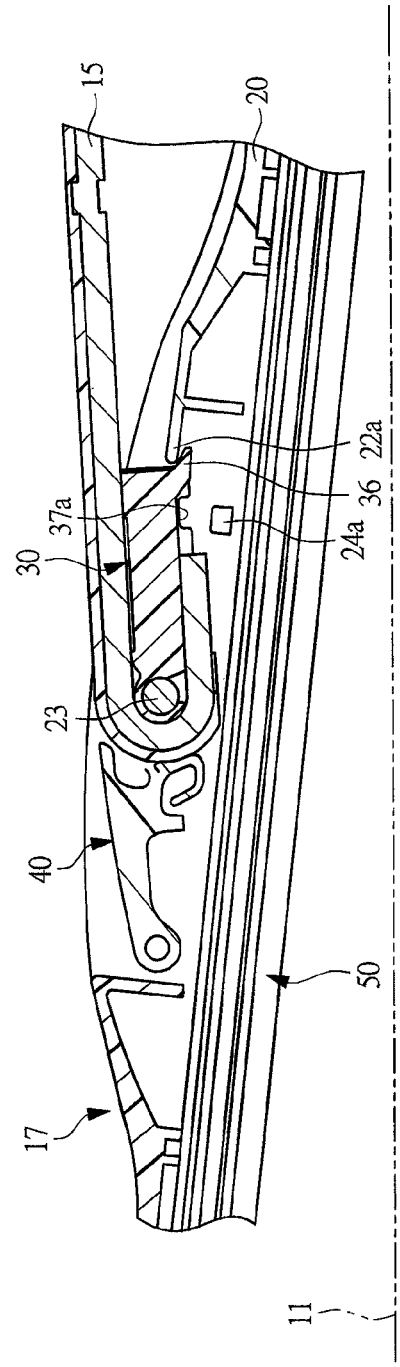

WIPER BLADE

CROSS-REFERENCE TO RELATED APPLICATIONS

Applicant hereby claims foreign priority benefits under U.S.C. §119 from Japanese Patent Applications No. 2007-050656 filed on Feb. 28, 2007 and No. 2007-050655 filed on Feb. 28, 2007, the contents of which are incorporated by reference herein.

TECHNICAL FIELD OF THE INVENTION

The present invention relates to a wiper blade that swingably moves on a windshield of a vehicle to wipe the windshield.

BACKGROUND OF THE INVENTION

Conventionally, a vehicle such as an automobile is provided with a wiper apparatus for wiping attachments adhering to a windshield, such as rain, snow, and splash from a preceding vehicle, in order to assure a field of view of a driver. Such a wiper apparatus includes a wiper arm that is swingably driven via an electric motor, and a wiper blade that is mounted on a tip side of the wiper arm. The wiper blade has a blade holder that is rotatably mounted on the tip side of the wiper arm, and a blade rubber that is held by the blade holder. The blade rubber becomes in a state where a spring provided inside the wiper arm applies a pressing force to the windshield. In this state, the wiper arm is driven by the electric motor, so that the blade rubber swingably moves on the windshield to wipe the windshield.

Meanwhile, when the wiper blade is prevented from being fixed and adhering to the windshield in a cold season and the vehicle is washed, a user may raise the wiper arm against a force of the spring. At this time, some users may hold a tip side of the wiper blade to raise the wiper arm or may fold the raised wiper arm in a state where the wiper blade rotates at or beyond a predetermined angle with respect to the wiper arm.

Therefore, in Japanese Utility-Model Application Laid-Open Publication No. 02-129952 (FIGS. 1 and 2) (Patent Document 1), for example, is disclosed a wiper blade in which since the rotation of the wiper blade at or beyond the predetermined angle is regulated with respect to the wiper arm, the wiper arm can be easily raised and the raised wiper arm can be folded correctly. The wiper blade described in Patent Document 1 has, between a primary lever (blade holder) and a U-shaped spring member (arm mounting member) rotatably provided to it, rotation regulating members (engaging protrusion and engaging hole) that are mutually engaged with their concave and convex portions, wherein this rotation regulating members prevents the wiper blade from rotating at or beyond the predetermined angle with respect to the wiper arm.

SUMMARY OF THE INVENTION

However, according to the wiper blade described in Patent Document 1 mentioned above, the rotation of the wiper blade with respect to the wiper arm has been not regulated to a direction in which the engaging protrusion and the engaging hole constituting the rotation regulating members are separate from each other. Accordingly, when the tip side of the blade holder rotates toward the windshield side with respect to the wiper arm, the wiper arm and the blade holder contact with each other. This causes the problems that repetitive operations of such contact may peel off a coating of the wiper arm or blade holder to bring early its rust, and that damage of both members may make wiping performance early deteriorate.

An object of the present invention is to provide a wiper blade in which a tip side of a blade holder toward a windshield is regulated so as not to rotate at or beyond a predetermined angle with respect to a wiper arm.

A wiper blade according to the present invention is a wiper blade mounted on a wiper arm swingably provided to a vehicle, and moving swingably on a windshield to wipe the windshield, the wiper blade comprising: a blade rubber contacting with the windshield; a blade holder holding the blade rubber; an arm mounting member rotatably mounted on a rotating shaft provided to the blade holder, the arm mounting member being mounted on the wiper arm; a first engaging portion formed at a portion of the blade holder opposing to the arm mounting member; and a second engaging portion formed at a portion of the arm mounting member opposing to the blade holder, wherein engagement of the first and second engaging portions admits rotation of a tip side of the blade holder toward the windshield at or beyond a predetermined angle to be regulated with respect to the wiper arm.

The wiper blade according to the present invention is such that the first engaging portion is formed as a convex portion protruding from the blade holder toward the arm mounting member, and the second engaging member is formed as a concave portion engaged with the convex portion.

The wiper blade according to the present invention is such that the arm mounting member includes a rotation regulating portion for regulating the rotation of a distal side of the blade holder toward the windshield at or beyond the predetermined angle.

The wiper blade according to the present invention further comprises: a third engaging portion provided to a distal side of the arm mounting member; and a fourth engaging portion provided to the blade holder and engaged with the third engaging portion; wherein at least one of the third and fourth engaging portions is formed so as to be elastically deformable, and engagement of the third and fourth engaging portions admits rotation of a distal side of the blade holder toward the windshield at or beyond the predetermined angle to be regulated with respect to the wiper arm.

The wiper blade according to the present invention further comprises a rubber abutting portion provided to the arm mounting portion so as to abut on the blade rubber in a state where the engagement of the third and fourth engaging portions is released.

The wiper blade according to the present invention is such that the rubber abutting portion is formed so that a gap between the blade rubber and the rubber abutting portion is larger as the rubber abutting portion is separate from the rotating shaft in a state where the third and fourth engaging portions are engaged.

According to the present invention, the first engaging portion is formed at the portion of the blade holder opposing to the arm mounting member, and the second engaging portion is formed at the portion of the arm mounting member opposing portion to the blade holder, whereby the engagement of the first and second engaging portions admits the rotation of the tip side of the blade holder toward the windshield at or beyond the predetermined angle to be regulated with respect to the wiper arm. Accordingly, the wiper arm and the blade holder can be prevented from contacting with each other. Therefore, it can be suppressed that a coating of the wiper arm or blade holder is peeled off to bring early its rust and that damages of both members make their wiping performance early deteriorate.

According to the present invention, the first engaging portion is formed as a convex portion protruding from the blade holder toward the arm mounting member, and the second engaging member is formed as a concave portion engaged with the convex portion engages, so that the engagement of the convex and concave portions admits the rotation of the tip side of the blade holder toward the windshield at or beyond the predetermined angle to be regulated with respect to the wiper arm.

According to the present invention, the arm mounting member includes the rotation regulating portion for regulating the rotation of the distal side of the blade holder toward the windshield at or beyond the predetermined angle, so that the blade holder can be rotated within a predetermined-angle range. Accordingly, while the wiper arm is raised, to rotate the wiper blade with respect to the wiper arm more than necessarily can be suppressed.

According to the present invention, the distal side of the arm mounting member is provided with the third engaging portion, the blade holder is provided with the fourth engaging portion engaged with the third engaging portion, and at least one of the third and fourth engaging portions is formed so as to be elastically deformable, whereby the engagement of the third and fourth engaging portions admits the rotation of the distal side of the blade holder toward the windshield at or beyond the predetermined angle to be regulated with respect to the wiper arm. Accordingly, when an external force with a predetermined strength or more is applied in a direction of the rotation, the at least one of the third and fourth engaging portions is elastically deformed. For this reason, the engagement of the third and fourth engaging portions is released, whereby the rotation of the distal side of the blade holder toward the windshield at or beyond the predetermined angle is permitted with respect to the wiper arm. Accordingly, it is possible to suppress the damages of the third and fourth engaging portions, and to maintain the rotation regulating function by the third and fourth engaging portions for a long time.

According to the present invention, the arm mounting member is provided with the rubber abutting portion for abutting on the blade rubber in the state where the engagement of the third and fourth engaging portions is released, so that after the rotation of the arm mounting member toward the blade holder is permitted, the rubber abutting portion can be made to abut on the blade rubber. For this reason, it is possible to prevent the arm mounting member from excessively rotating with respect to the blade holder. Further, since the blade rubber functions as a cushioning material, the rubber abutting portion can be protected from an impact.

According to the present invention, the rubber abutting portion is formed so that the gap between the blade rubber and the rubber abutting portion becomes larger as the rubber abutting portion is separate from the rotating shaft, whereby after the rotation of the arm mounting member with respect to the blade holder is permitted, it is possible to enlarge an area of a portion at which the rubber abutting portion and the blade rubber abut on each other. Therefore, a stress exerted at a time when the rotation of the arm mounting member with respect to the blade rubber is permitted can be distributed to the blade holder.

BRIEF DESCRIPTION OF THE DRAWINGS

FIG. 9A is an explanatory diagram for explaining a rotation range of the wiper blade with respect to a wiper arm;

FIG. 9B is an explanatory diagram for explaining a rotation range of the wiper blade with respect to a wiper arm;

DESCRIPTION OF THE PREFERRED EMBODIMENTS

Hereinafter, a first embodiment of a wiper blade according to the present invention will be described in detail with reference to the drawings.

Figure 1:
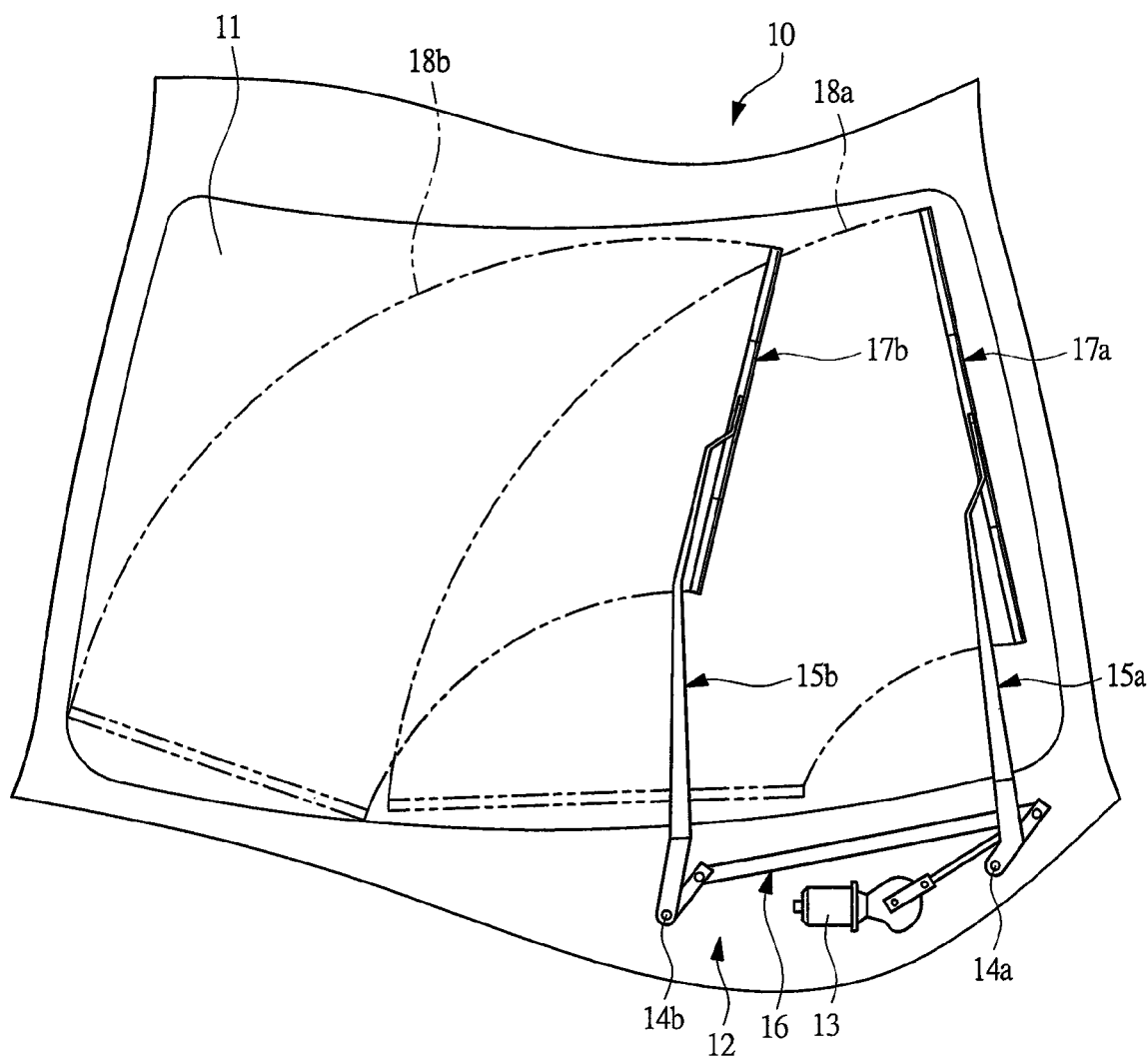
FIG. 1 is an explanatory diagram for explaining a wiper apparatus mounted on a vehicle.
Figure 2:
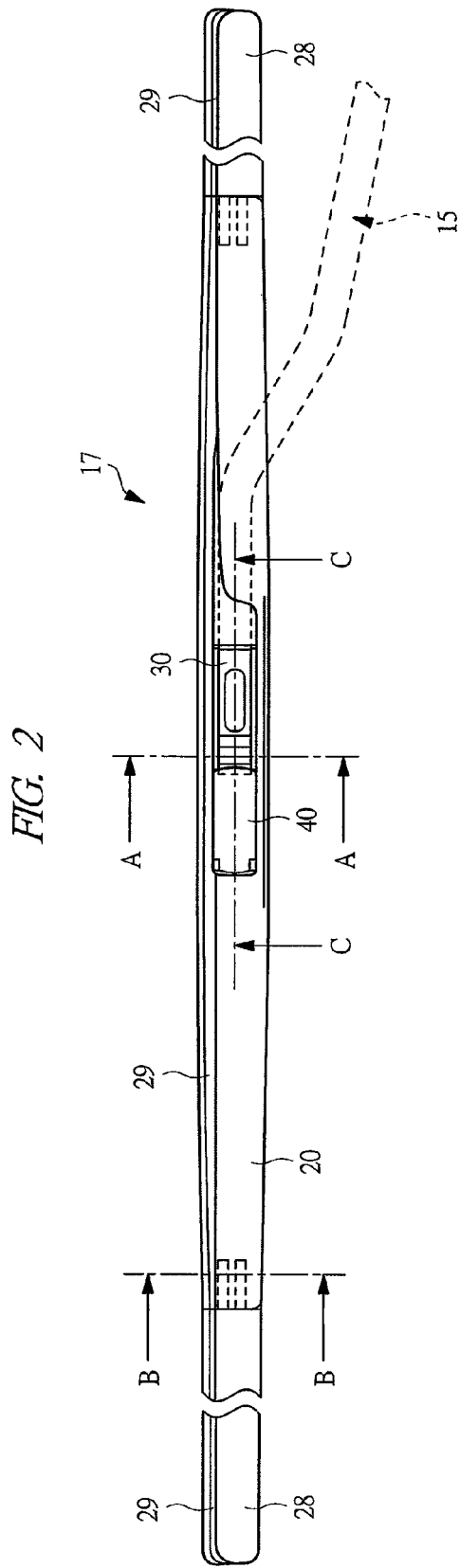
FIG. 2 is an enlarged view showing the wiper blade in FIG. 1.
Figure 3:
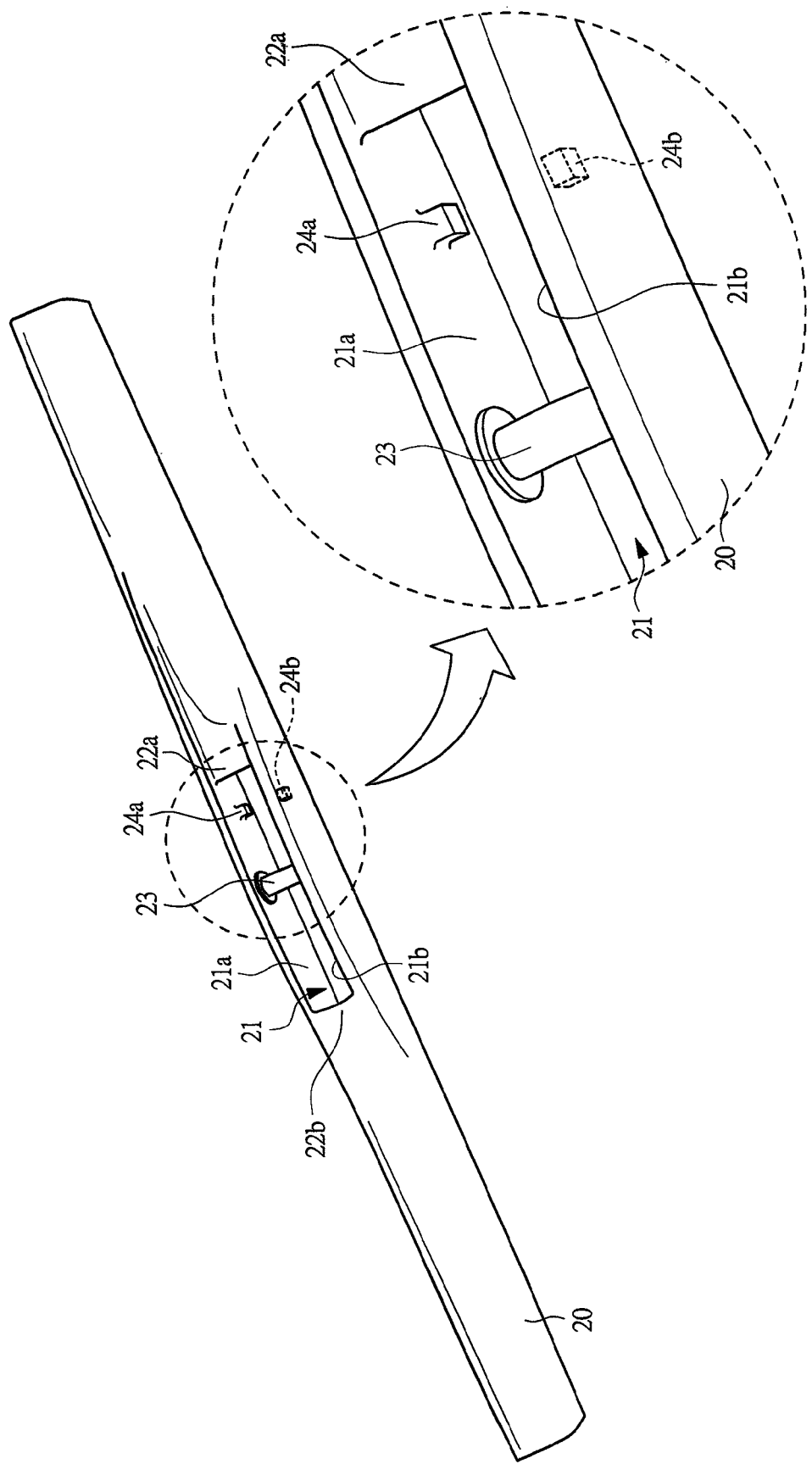
FIG. 3 is a perspective view showing a blade holder.
Figure 4:
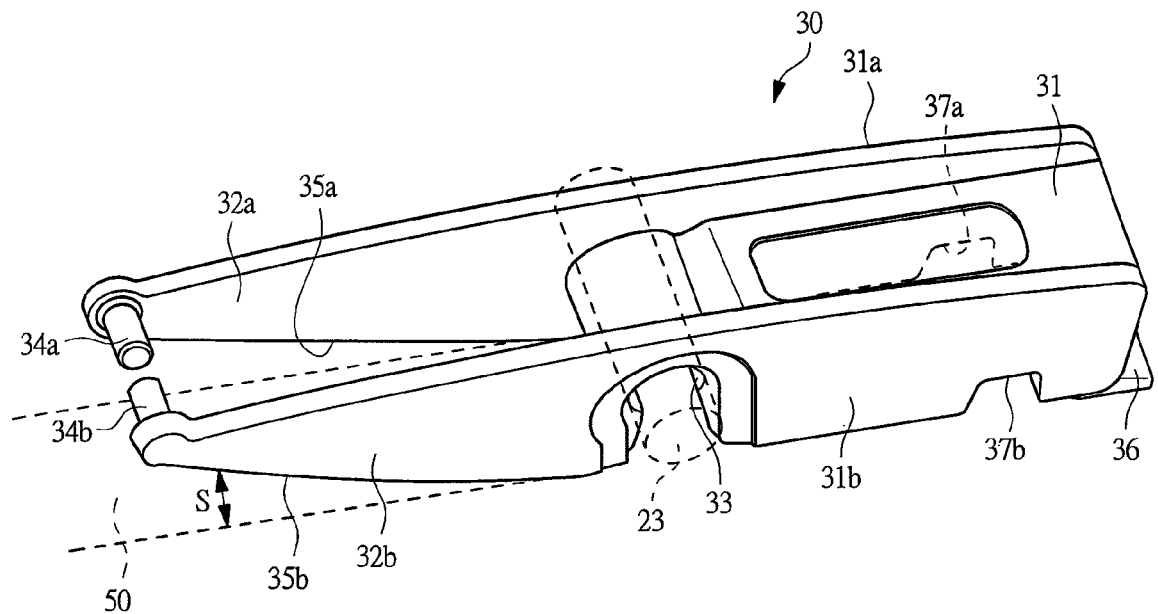
FIG. 4 is a perspective view showing an arm mounting member.
Figure 5:
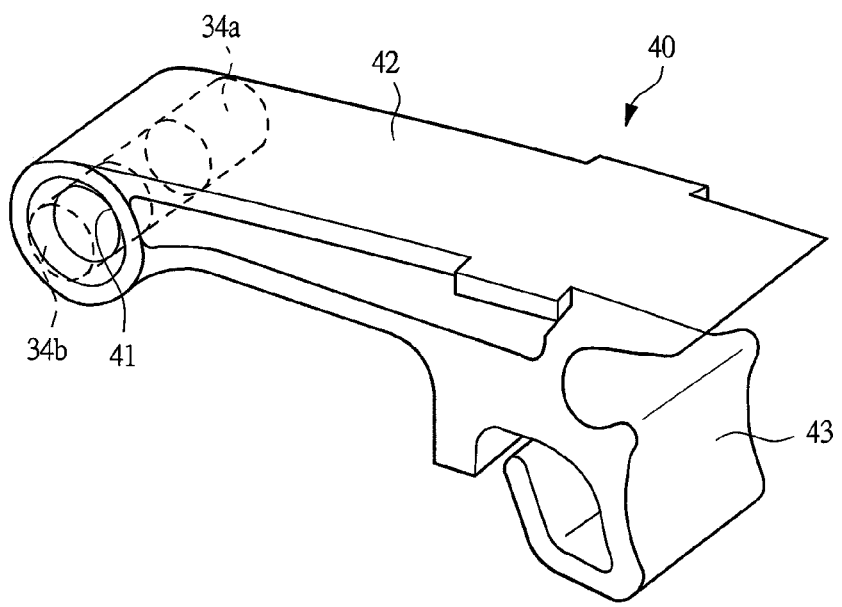
FIG. 5 is a perspective view showing an arm supporting member.
Figure 6:
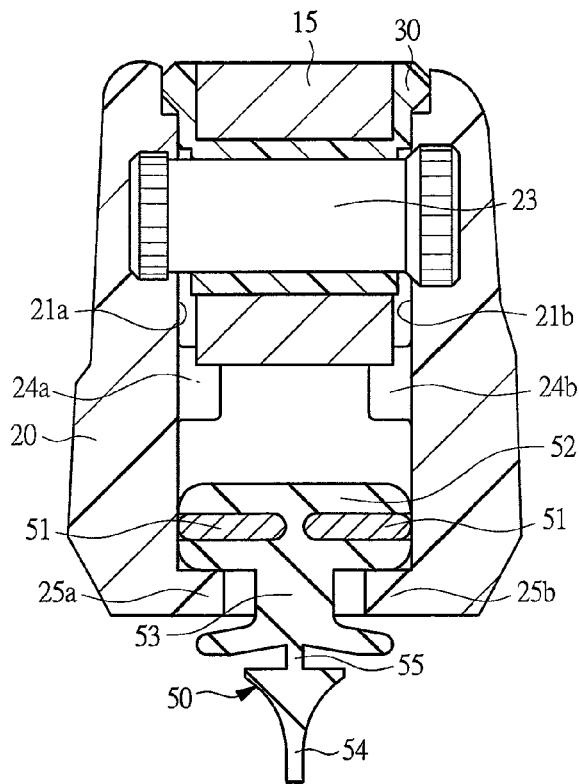
FIG. 6 is a cross-sectional view taken along line A-A in FIG. 2.
Figure 7:
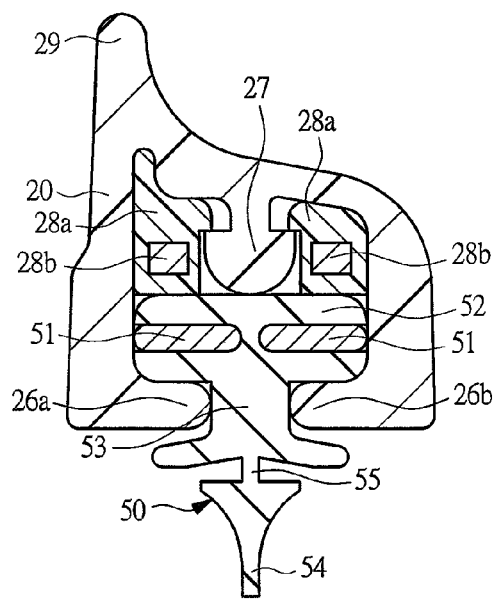
FIG. 7 is a cross-sectional view taken along line B-B in FIG. 2.
Figure 8:
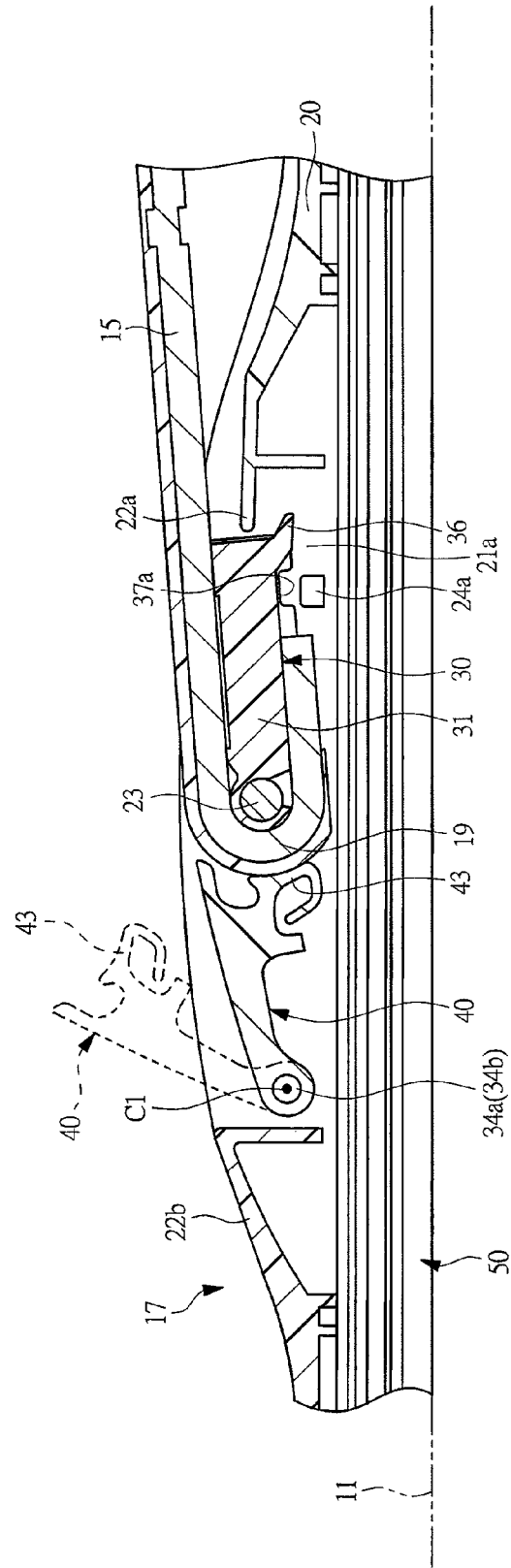
FIG. 8 is a partial cross-sectional view taken along line C-C in FIG. 2.

FIG. 1 is an explanatory diagram for explaining a wiper apparatus mounted on a vehicle; FIG. 2 is an enlarged view showing the wiper blade in FIG. 1; FIG. 3 is a perspective view showing a blade holder; FIG. 4 is a perspective view showing an arm mounting member; FIG. 5 is a perspective view showing an arm supporting member; FIG. 6 is a cross-sectional view taken along line A-A in FIG. 2; FIG. 7 is a cross-sectional view taken along line B-B in FIG. 2; FIG. 8 is a cross-sectional view taken along line C-C in FIG. 2; FIG. 9A is an explanatory diagram for explaining a rotation range of the wiper blade with respect to a wiper arm; and FIG. 9B is an explanatory diagram for explaining a rotation range of the wiper blade with respect to the wiper arm.

As shown in FIG. 1, on a vehicle 10 is mounted a wiper apparatus 12 for wiping attachments adhering to a front glass 11 as a windshield, such as rain, snow, and splash from a preceding vehicle, in order to assure a field of view of a driver.

This wiper apparatus 12 comprises: a wiper motor 13 that is driven for rotation by operating a wiper switch (not illustrate) provided inside the vehicle etc.; driver-seat-side and passenger-seat-side wiper shafts 14a and 14b provided rotatably to the vehicle 10; driver-seat-side and passenger-seat-side wiper arms 15a and 15b whose distal sides are fixed to the wiper shafts 14a and 14b and whose tip sides swingably move on the front glass 11; and a link mechanism 16 that converts rotation movement of the wiper motor 13 into oscillation movement of each of the wiper arms 15a and 15b.

On the tip sides of the wiper arms 15a and 15b are respectively mounted driver-seat-side and passenger-seat-side wiper blades 17a and 17b, which are formed into the same shape, so as to be rotatable in a vertical direction of the front glass 11. The wiper blades 17a and 17b contact with the front glass 11 in an elastic compression manner by springs (not shown) provided inside the wiper arms 15a and 15b, respectively. Then, when the wiper motor 12 is driven for rotation, the wiper blades 17a and 17b slide respectively within wiping areas 18a and 18b shown by two-dot chain lines of FIG. 1 on the front glass 11, that is, in areas between their lower inversion positions (positions for stopping the wiper arms) and their upper inversion positions.

FIG. 2 shows the driver-seat-side wiper blade, and since the driver-seat-side and passenger-seat-side wiper blades have the same structure, only the driver-seat-side wiper blade will be described hereinafter. Further, to explain the driver-seat-side wiper blade, the term "driver-seat-side" is not denoted to structural components and they will be called simply "wiper blade" or the like. Further, the suffixes "a" and "b" denoted to ends of the reference numerals for distinguishing "driver-seat-aside" from "passenger-seat-side" will be omitted.

As shown in FIG. 2, the wiper blade 17 includes: a blade holder 20; an arm mounting member 30 that is mounted rotatably on a substantially center portion of the blade holder 20 in its longitudinal direction; and an arm supporting member 40 that is mounted rotatably on the arm mounting member 30 and supports the tip side of the wiper arm 15 between the arm mounting member 30 and the arm supporting member.

As shown in FIG. 3, in the substantially center portion of the blade holder 20 in the longitudinal direction is formed a receiving hole 21 that receives the arm mounting member 30 and the arm supporting member 40 (see FIGS. 4 and 5) so as to penetrate through the center portion in a vertical direction shown in FIG. 3.

The receiving hole 21 is formed by opposing wall portions (opposing portions) 21a and 21b extending along the longitudinal direction of the blade holder 20 and by bridging portions 22a and 22b formed between the opposing wall portions 21a and 21b. Between the opposing wall portions 21a and 21b is provided a rotating pin (rotating shaft) 23 rotatably mounted on the arm mounting member 30. Further, at the vicinity of the rotating pin 23 of the opposing wall portions 21a and 21b is protrudingly formed a pair of convex portions 24a and 24b as first engaging portions so as to oppose inwardly to each other.

The arm mounting member 30, as shown in FIG. 4, has a main body portion 31 covered with the tip side of the wiper arm 15, and arm portions 32a and 32b formed integrally with the main body portion 31 and forming a pair in a vertical direction shown in FIG. 4. In the main body portion 31 is formed a concave slot 33 that is mounted rotatably on the rotating pin 23 (broken line in FIG. 4) provided in the blade holder 20. On the tip sides of the respective arm portions 32a and 32b (left side in FIG. 4) is protrudingly formed a pair of pins 34a and 34b, on which the arm supporting member 40 is rotatably mounted, so as to oppose inwardly to each other.

The respective arm portions 32a and 32b are formed so that each thickness dimension of them in a vertical direction shown in FIG. 4 becomes gradually smaller as they are separated from the concave slot 33 to be mounted on the rotating pin 23. That is, the arm portions 32a and 32b are formed so that dimension of each gap "S" between the arm portions 32a and 32b and the blade rubber 50 (shown by the broken line of FIG. 4) becomes larger as they are separate from the rotating pin 23 to a left side shown in FIG. 4. On lower end sides of the respective arm portions 32a and 32b as shown in FIG. 4 are formed rubber abutting portions 35a and 35b that can abut on a back surface side (shown on an upper side in FIG. 4) of the blade rubber 50.

An engaging protrusion 36 as an rotation regulating portion according to the present invention is formed integrally with the main body portion 31 of the arm mounting member 30 so as to extend toward a right side shown in FIG. 4, wherein this engaging protrusion 36 can be engaged with the bridging portion 22a (see FIG. 3) constituting the receiving hole 21 of the blade holder 20.

In the respective wall portions (opposing portions) 31a and 31b of the main body portion 31 in the arm mounting member 30, a pair of concave portions 37a and 37b as second engaging portions is formed so as to go close to the engaging protrusion 36. Each of the concave portions 37a and 37b is formed into such a notched shape as to have an opening downward in FIG. 4. Since the respective convex portions 24a and 24b of the blade holder 20 are inserted from the respective openings, the concave portions 37a and 37b can be engaged with the convex portions 24a and 24b, respectively.

As shown in FIG. 5, the arm supporting member 40 has: a mounting cylindrical portion 41 that is rotatably mounted on the respective pins 34a and 34b (shown by the broken line in FIG. 5) formed on the arm portions 32a and 32b of the arm mounting member 30; a main body portion 42 that is formed integrally with the mounting cylindrical portion 41; and a supporting portion 43 that is formed integrally with the main body portion 42 and is elastically deformable in right and left directions shown in FIG. 5. The supporting portion 43 is formed so as to be thinner than the main body portion 43, whereby the supporting portion 43 is elastically deformed in the right and left directions shown in FIG. 5.

The blade holder 20 is formed into a substantially hallow shape as shown in FIGS. 6 and 7, wherein a blade rubber 50 is held inside the blade holder 20. In a longitudinal direction inside the blade holder 20, a pair of guide protrusions 25a and 25b is formed integrally with the blade holder 20 so as to oppose to each other, whereby the respective guide protrusions 25a and 25b guide the mounting of the blade rubber 50 onto the blade holder 20.

A pair of holding claws 26a and 26b protruding more inwardly than the guide protrusions 25a and 25b is formed at a portion, which corresponds to line B-B shown in FIG. 2 and is further located inside the respective guide protrusions 25a and 25b, so that the blade rubber 50 is prevented from being released from the blade holder 20 by the respective holding claws 26a and 26b. Note that although the respective holding claws 26a and 26b are provided in the portion corresponding to line B-B shown in FIG. 2, the same claws are provided also in a portion centered about line A-A and opposite to the line B-B, whereby the blade rubber 50 is supported by the blade holder 20 at two points.

As shown in FIG. 7, a abutting protrusion 27 that abuts on a back surface side of the blade rubber 50 is formed integrally with a portion of the blade holder 20 corresponding to the respective holding claws 26a and 26b. Thus, since the abutting protrusion 27 abuts on the back surface side of the blade rubber 50, excessive inclination of the blade rubber 50 toward the blade holder 20 in wiping is suppressed.

On the right and left sides of the blade holder 20 in FIG. 2, a pair of covers 28 is mounted so as to cover the blade rubber 50. Since respective claw portions 28a formed integrally with each of the covers 28 are fixed into the abutting protrusion 27 formed inside the blade holder 20, the covers 28 are each prevented from being released from the blade holder 20. Note that, as shown in FIG. 7, core bars 28b each made of iron steel by insertion molding or the like are inserted into the claw portions 28a of the cover 28, thereby making the claw portions 28a flexible and improving their durability against repeated elastic deformation.

A fin 29 is formed integrally with the blade holder 20 and the covers 28 so as to extend along the longitudinal direction of the blade holder 20. This fin 29 prevents the blade rubber 50 from floating from the front glass 11 due to wind caused by a high-speed run or the like of the vehicle, and suppresses the deterioration of the wiping performance of the wiper blade 17.

The blade rubber 50 is made of materials such as natural rubber and chloroprene rubber, and formed by pouring the molten materials into a mold. This blade rubber 50 has, as shown in FIGS. 5 and 6, a main body portion 52 on which a pair of vertebras 51 as plate-shaped springs made of steel material is mounted. Each of the vertebras 51 has a curvature radius smaller than that of the front glass 11 and is formed into a bow shape so as to be curved, whereby a pressing force of the front glass 11 to an entire longitudinal-directional region of the blade rubber 50 is made substantially uniform.

A body portion 53 is formed integrally with a lower side of the main body portion 52 of the blade rubber 50 shown in FIGS. 6 and 7 so as to oppose to the guide protrusions 25a and 25b and the holding claws 26a and 26b of the blade holder 20. A lip portion 54 contacting to the front glass 11 is formed integrally with the further lower side of this body portion 53 shown in FIGS. 6 and 7. This lip portion 54 and the body portion 53 are connected to each other by a neck portion 55 for performing a smooth inclination action (invention action) of the lip portion 54 to the front glass 11 during the wiping.

The wiper blade 17 is formed by adopting, as shown in FIG. 8, a so-called U-hook type of connecting method in which the wiper blade is connected via the arm mounting member 30 to a U-shaped portion 19 formed at the tip side of the wiper arm 15. An inside of the U-shaped portion 19 of the wiper arm 15 contacts to the arm mounting member 30 so as to cover the main body portion 31 of the arm mounting member 30 from a vertical direction shown in FIG. 8, and an outside of the U-shaped portion 19 contacts to the supporting portion 43 of the arm supporting member 40. Thus, since the U-shaped portion 19 of the wiper arm 15 is sandwiched between the arm mounting member 30 and the arm supporting member 40, namely, since the U-shaped portion 19 is supported by an elastic force of the supporting portion 43, the wiper blade 17 is mounted on the wiper arm 15.

When the wiper blade 17 is removed from the wiper arm 15, as shown by the broken line in FIG. 8, the arm supporting member 40 is rotated around a center shaft C1 (respective pins 34a and 34b) so as to be raised. The elastic force to the U-shaped portion 19 due to the supporting portion 43 is released, and simultaneously the wiper blade 17 is slid to the wiper arm 15, so that the wiper blade 17 can be removed from the wiper arm 15.

Herein, FIG. 8 shows a state where the wiper arm 15 is folded toward the front glass 11, that is, a wiping action state (reference state) of the wiper blade 17. In this reference state, the engaging protrusion 36 is separate from the bridging portion 22a and is in a state of being unengaged with the bridging portion 22a, while the convex portion 24a is separate from the concave portion 37a and is in a state of being unengaged with the concave portion 37a. Accordingly, when the wiper blade 17 is in the reference state, the wiper blade 17 can rotate with respect to the wiper arm 15 within a predetermined-angle range.

Next, the case where the wiper blade 17 rotates from the reference state shown in FIG. 8 toward one or the other direction with respect to the wiper arm 15 will be described based on FIGS. 9A and 9B. FIG. 9A represents a state where the tip side (left side in FIG. 9A) of the wiper blade 17 is rotated toward the front glass 11; and FIG. 9B represents a state where the distal side (right side in FIG. 9B) of the wiper blade 17 is rotated toward the front glass 11.

As shown in FIG. 9A, the wiper arm 15 is grasped so that the wiper blade 17 rotates around the rotating pin 23 in the one direction (in a counterclockwise direction). At this time, if a range of the rotation reaches the predetermined angle, the convex portion 24a enters into and is engaged with the concave portion 37a. Accordingly, since the convex portion 24a and the concave portion 37a are engaged, the further rotation of the wiper blade 17 with respect to the wiper arm 15 is regulated, whereby, as shown in FIG. 9A, it is possible to avoid the contact of the wiper arm 15 with the wiper blade 17. Note that although only the convex portion 24a and the concave portion 37a are shown in FIG. 9A, the convex portion 24b and the concave portion 37b are also engaged with each other in the same manner.

As shown in FIG. 9B, the tip side of the wiper blade 17 is grasped so that the wiper blade 17 rotates around the rotating pin 23 in the other direction (in a clockwise direction). At this time, if a range of the rotation reaches the predetermined angle, the engaging protrusion 36 is subsequently engaged with the bridging portion 22a. Accordingly, since the engaging protrusion 36 and the bridging portion 22a are engaged, the further rotation of the wiper blade 17 with respect to the wiper arm 15 can be regulated.

As detailed above, in the wiper blade 17 according to the first embodiment, the convex portions 24a and 24b are formed at the portion of the blade holder 20 opposing to the arm mounting member 30, and the concave portions 37a and 37b are formed at the portion of the arm mounting member 30 opposing to the blade holder 20, so that engagement of the convex portions 24a and 24b with the concave portions 37a and 37b admits the rotation of the tip side of the wiper blade 17 toward the front glass 11 at or beyond the predetermined angle to be regulated with respect to the wiper arm 15, thereby making it possible to prevent the contact between the wiper arm 15 and the wiper blade 17. Consequently, it is possible to suppress such problems that the coating of the wiper arm 15 or the wiper blade 17 is peeled off to bring early its rust and that the damages of both members make their wiping performance early deteriorate.

Further, in the wiper blade 17 according to the first embodiment, since the arm mounting member 30 has the engaging protrusion 36 that regulates the rotation of the distal side of the wiper blade 17 toward the front glass 11 at or beyond the predetermined angle, the wiper blade 17 can be rotated within the predetermined-angle range with respect to the wiper arm 15. Accordingly, under a state of raising the wiper arm 15 (lock back state), to make the rotation of the wiper blade 17 with respect to the wiper arm 15 more than necessary can be suppressed.

Figure 10A:
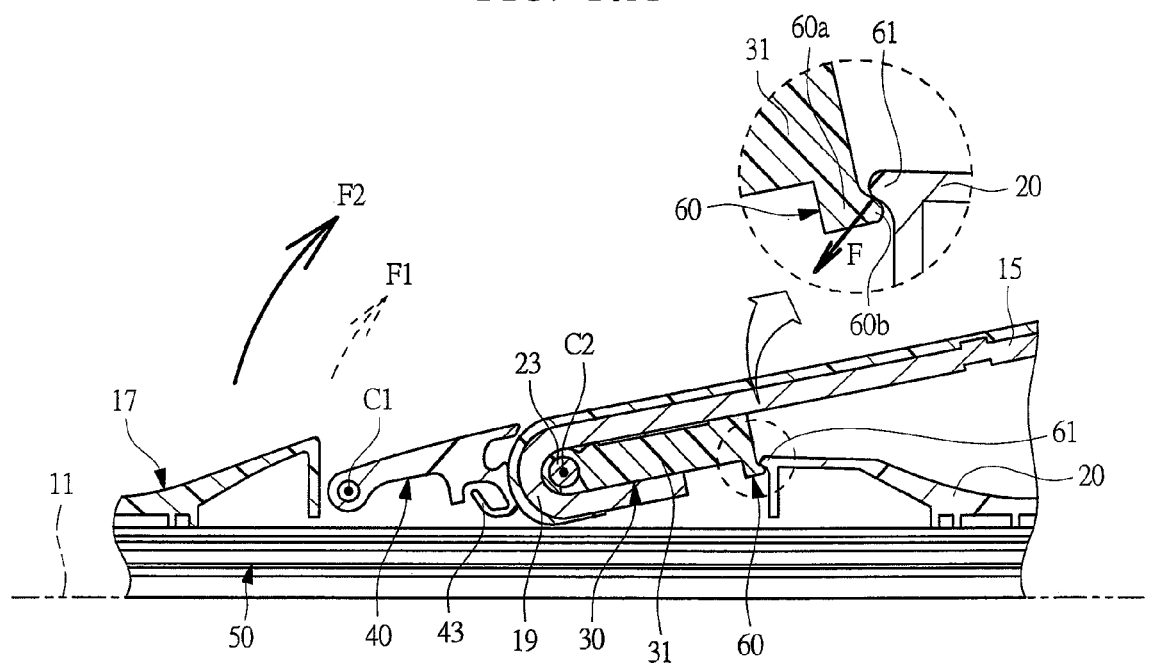
FIG. 10A is an explanatory diagram for explaining a wiper blade according to a second embodiment.
Figure 10B:
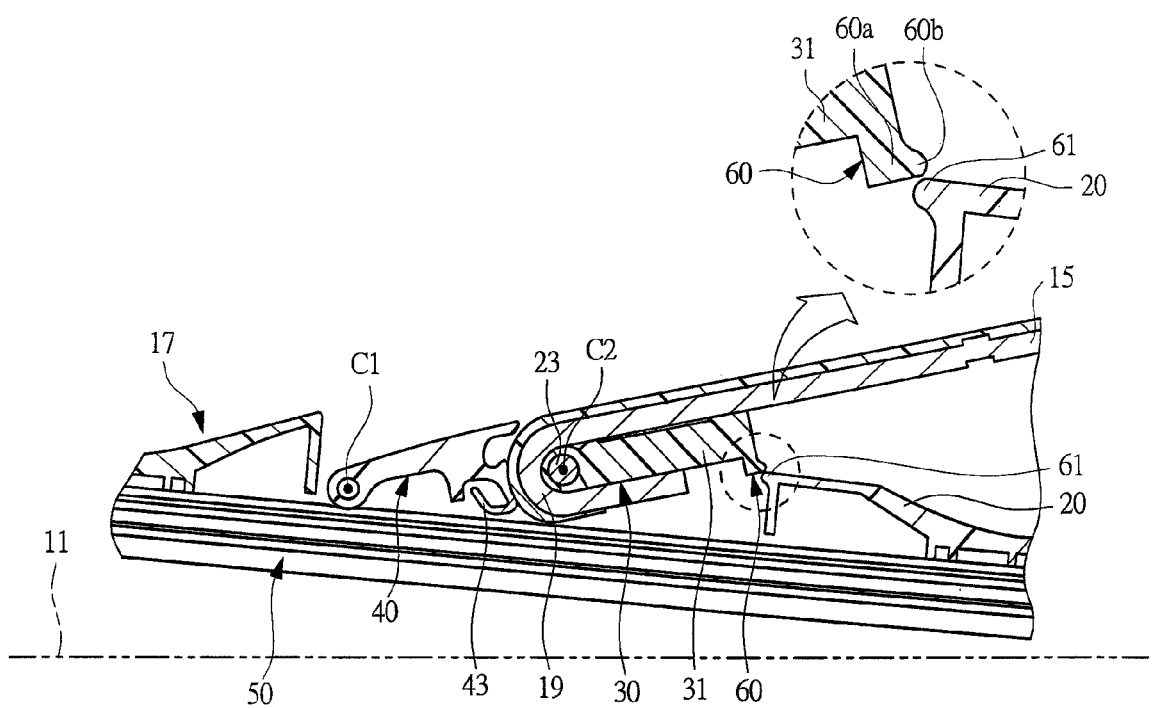
FIG. 10B is an explanatory diagram for explaining the wiper blade according to the second embodiment.
Figure 11:
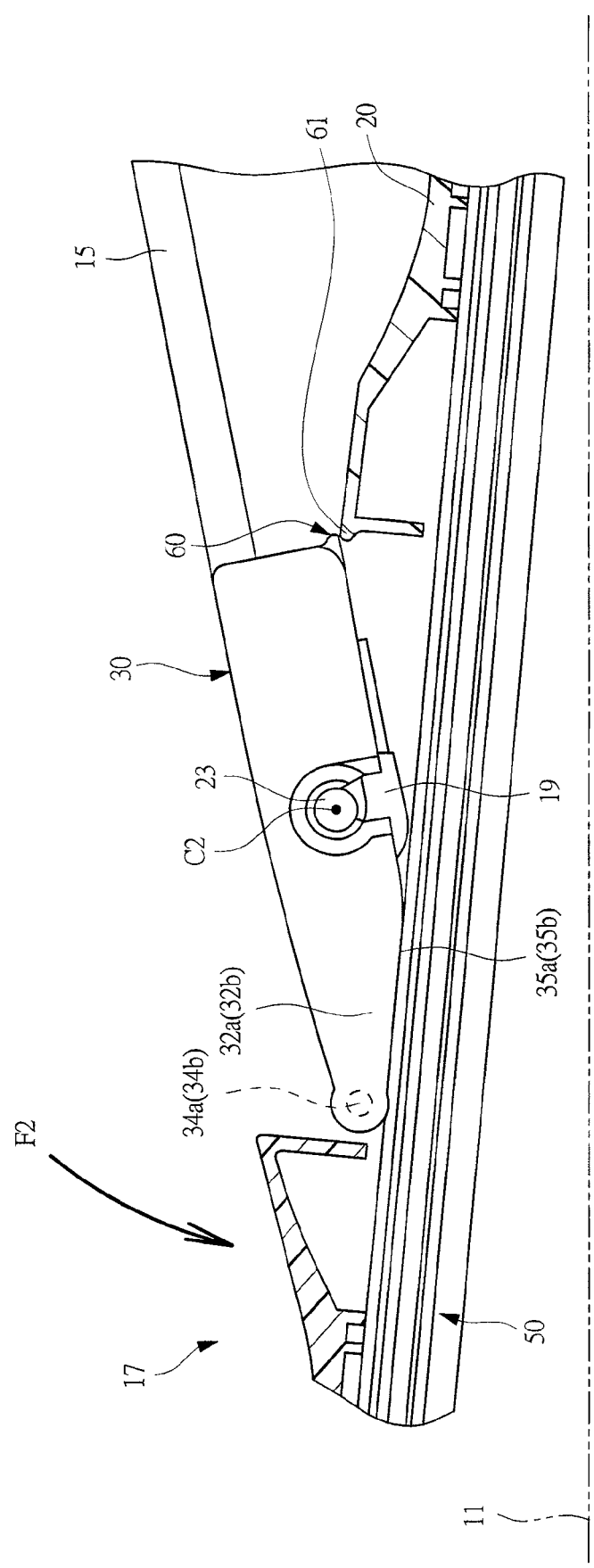
FIG. 11 is a partial cross-sectional view showing an abutting state between a rubber abutting portion of the wiper blade in FIGS. 10A and 10B and the blade rubber.

Next, a second embodiment of a wiper blade according to the present invention will be described in detail with reference to the drawings. FIGS. 10A and 10B represent explanatory diagrams for explaining a wiper blade according to a second invention; and FIG. 11 represent a partial cross-sectional view showing an abutting state between a rubber abutting portion of the wiper blade and the blade rubber.

Note that although the pair of convex portions 24a and 24b as first engaging portions and the pair of concave portions 37a and 37b (see FIG. 8) as second engaging portions are not illustrated in the second embodiment, the convex portions 24a and 24b and the concave portions 37a and 37b are provided respectively to the blade holder 20 and the arm mounting portion 30 in the same manner as the first embodiment mentioned above. Except the convex portions 24a and 24b and the concave portions 37a and 37b, components having the same functions as those in the first embodiment are denoted by the same reference numerals, and their detailed description will not be omitted.

As shown in FIGS. 10A and 10B, an arm-side engaging protrusion (third engaging portion) 60 is formed integrally with a distal side (right side of FIG. 10A) of the main body portion 31 in the arm mounting member 30, and this arm-side engaging protrusion 60 is engaged with a holder-side engaging protrusion 61 of the blade holder 20. Thus, since the arm-side engaging protrusion 60 and the holder-side engaging protrusion 61 are engaged, the rotation of the distal side of the wiper blade 17 toward the front glass 11 at or beyond the predetermined angle is regulated with respect to the wiper arm 15.

The arm-side engaging protrusion 60 has a leg portion 60a and a head portion 60b provided integrally with a tip side of the leg portion 60, wherein the head portion 60b is provided at a tip side separate from the distal side of the leg portion 60a. By such a structure, rigidity of the arm-side engaging protrusion 60 is lowered, and the arm-side engaging protrusion 60 is easily flexible from its distal side. Accordingly the arm-side engaging protrusion 60 is formed so as to be elastically deformable.

The holder-side engaging protrusion (fourth engaging portion) 61, which is engaged with the arm-side engaging protrusion 60 of the main body portion 31 in the arm mounting member 30, is formed integrally with the blade holder 20. This holder-side engaging protrusion 61 is formed so that its height protruding from the blade holder 20 becomes substantially the same as that protruding from the head portion 60b in the arm-side engaging protrusion 60. The holder-side engaging protrusion 61 has no leg portion similarly to the arm-side engaging protrusion 60, so that rigidity of the holder-side engaging protrusion 61 is relatively high. That is, the arm-side engaging protrusion 60 is formed so as to be elastically deformable while the holder-side engaging protrusion 61 is formed so as not to be elastically deformable.

Next, an action of the wiper blade 17 having the above-mentioned structure according to the second embodiment will be described with reference to the drawings.

FIG. 10A shows a state where the arm-side engaging protrusion 60 and the holder-side engaging protrusion 61 are engaged with each other. In this case, there is in a state where the rotation of the distal side of the wiper blade 17 toward the front glass 11 at or beyond the predetermined angle is regulated with respect to the wiper arm 15. Accordingly, when a user or the like grasps the tip side (left side in FIG. 10A) of the wiper blade 17 and picks it up by a relatively small external force F1 shown by the broken-line arrow of FIG. 10A, the engaging state of the arm-side engaging protrusion 60 and the holder-side engaging protrusion 61 is maintained, whereby the wiper arm 15 can be raised. In addition, when the wiper arm 15 is folded from the state of raising the wiper arm 15, since the rotation of the arm mounting member 30 is regulated with respect to the blade holder 20, the blade rubber 50 can be reliably caused to oppose to the front glass 11.

Meanwhile, as shown by the bold-line arrow of FIG. 10A, when the user or the like grasps the tip side of the wiper blade 17 and picks it by generating momentum for an external force F2 larger than the above external force F1 (F2>F1), the wiper blade 17 is rotated around the rotating pin 23 (center shaft C2) of the blade holder 20 in the clockwise direction with respect to the wiper arm 15. Then, a force F from the holder-side engaging protrusion 61 toward an arrow direction shown in a broken-line circle of FIG. 10A is exerted on the arm-side engaging protrusion 60, whereby the arm-side engaging protrusion 60 is elastically deformed.

When the arm-side engaging protrusion 60 is elastically deformed, as shown in FIG. 10B, the head portion 60b goes over the holder-side engaging protrusion 61 according to elastic deformation of the arm-side engaging protrusion 60, and the engagement of the arm-side engaging protrusion 60 and the holder-side engaging protrusion 61 is released, which results in an engagement releasing state. This admits the rotation of the distal side of the wiper blade 17 toward the front glass 11 to be carried out at or beyond the predetermined angle with respect to the wiper arm 15. Thereafter, as shown in FIG. 11, the rubber abutting portions 35a and 35b in the arm portions 32a and 32b of the arm mounting member 30 abut on the back surface side of the blade rubber 50, whereby the excessive rotation of the wiper blade 17 with respect to the wiper arm 15 is suppressed. At this time, by a function of the blade rubber 50 as a cushioning material, an impact transmitted to the rubber abutting portions 35a and 35b is eased.

Further, as shown in FIG. 11, respective entire areas of the rubber abutting portions 35a and 35b, that is, the respective entire rubber abutting portions 35a and 35b in the left and right directions of FIG. 11 abut on the back surface side of the blade rubber 50. Therefore, a stress exerted at a time when the rotation of the wiper blade 17 with respect to the wiper arm 15 is admitted is distributed along the longitudinal direction of the blade rubber 50, whereby the stress focusing on a part of the blade rubber 50 is eased.

In order to return back from an engagement releasing state of releasing the engagement of the arm-side engaging protrusion 60 and the holder-side engaging protrusion 61 to the engaging state of engaging the arm-side engaging protrusion 60 and the holder-side engaging protrusion 61 (the state in FIG. 10A), as shown in FIG. 11, while the wiper arm 15 is grasped and picked up, another external force F2 having a predetermined strength (the same strength as the above external force F2) in a bold-line arrow direction of FIG. 11 is applied to the tip side of the wiper blade 17.

Thereby, the wiper blade 17 is rotated around the rotating pin 23 (center shaft C2) of the blade holder 20 in the counterclockwise direction with respect to the wiper arm 15, and the arm-side engaging protrusion 60 is elastically deformed and simultaneously the head portion 60b goes over the holder-side engaging protrusion 61. Thus, the engagement releasing state can be returned back to the engaging state where the arm-side engaging protrusion 60 and the holder-side engaging protrusion 61 are engaged.

As detailed above, the wiper blade 17 according to the second embodiment has the same operations and effects as those in the first embodiment mentioned above. In addition thereto, when an external force with a predetermined strength or larger is applied, the rotation of the distal side of the blade holder 20 toward the front glass 11 at or beyond the predetermined angle can be admitted with respect to the wiper arm 15. Accordingly, it is possible to suppress the damages of the arm-side engaging protrusion 60 and the holder-side engaging protrusion 61, and maintain a rotation regulating function by the arm-side engaging protrusion 60 and the holder-side engaging protrusion 61 for a long time.

Further, in the wiper blade 17 according to the second embodiment, after the rotation of the distal side of the blade holder 20 toward the front glass 11 at or beyond the predetermined angle is admitted with respect to the wiper arm 15, the rubber abutting portions 35a and 35b can be made to abut on the blade rubber 50. Thereby, it is possible to suppress the excessive rotation of the arm mounting member 30 with respect to the blade holder 20. Further, since the blade rubber 50 functions as a cushioning material, the rubber abutting portions 35a and 35b can be protected from any impact.

Furthermore, in the wiper blade 17 according to the second embodiment, the rubber abutting portions 35*a* and 35*b* are formed so that the dimension of the gap S (see FIG. 4) between the blade rubber 50 and the wiper blade 17 becomes larger as the rubber abutting portions are separate from the rotating pin 23 in the state where the arm-side engaging protrusion 60 and the holder-side engaging protrusion 61 are engaged. Therefore, after the rotation of the distal side of the blade holder 20 toward the front glass 11 at or beyond the predetermined angle is admitted with respect to the wiper arm 15, it is possible to enlarge an area of a portion at which the rubber abutting portions 35*a* and 35*b* abut on the blade rubber 50. Thereby, the stress exerted at the time when the rotation of the arm mounting member 30 is admitted with respect to the blade holder 20 can be distributed to the blade rubber 50.

Figure 12:
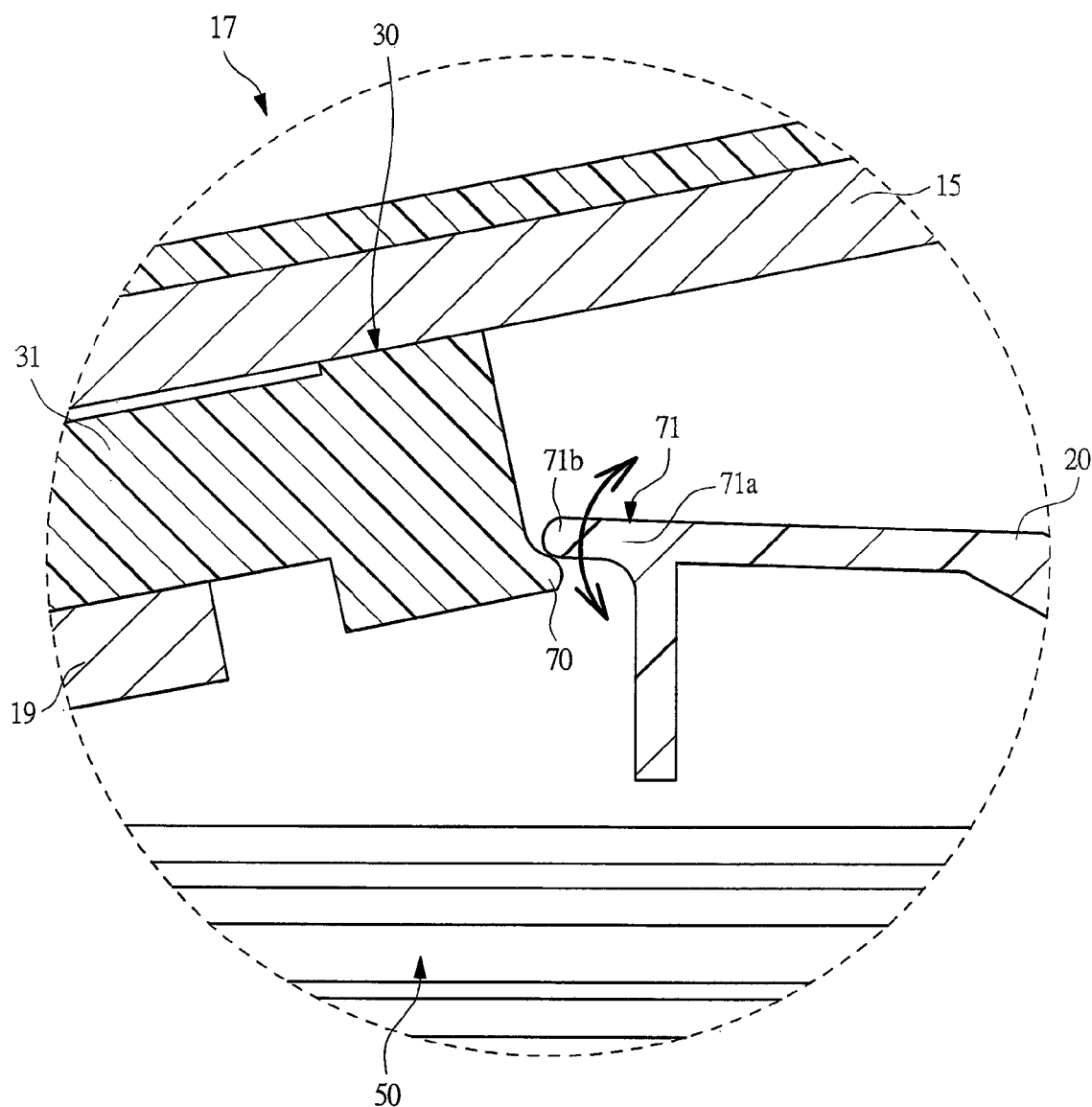
FIG. 12 is an enlarged cross-sectional view showing a principal portion of a wiper blade according to a third embodiment.

Next, a third embodiment of a wiper blade according to the present invention will be described in detail with reference to the drawings. FIG. 12 represents an enlarged cross-sectional view showing a principal part of a wiper blade according to the third embodiment. Note that components having the same functions as those in the above second embodiment are denoted by the same reference numerals, and its descriptions will be omitted.

As shown in FIG. 12, an arm-side engaging protrusion (third engaging portion) 70 is formed integrally with the main body portion 31 of the arm mounting member 30. In this arm-side engaging protrusion 70, the leg potion 60*a* shown in FIGS. 10A and 10B is omitted in comparison with the second embodiment mentioned above. Further, a holder-side engaging protrusion (fourth engaging portion) 71 is formed integrally with the blade holder 20, and this holder-side engaging protrusion 71 is formed by a leg portion 71*a* and a head portion 71*b* formed integrally with its tip side (left side shown in FIG. 12).

Thus, the arm-side engaging protrusion 70 and the holder-side engaging protrusion 71 are formed. Therefore, unlike the arm-side engaging protrusion 60 and the holder-side engaging protrusion 61 (see FIGS. 10A and 10B) in the second embodiment mentioned above, the arm-side engaging protrusion 70 is so formed as not to be elastically deformable, and the holder-side engaging protrusion 71 is so formed as to be elastically deformable (see the bold-line arrow shown in FIG. 12). Accordingly, the wiper blade 17 according to the third embodiment can also have the same operations and effects as those in the second embodiment mentioned above.

Figure 13:
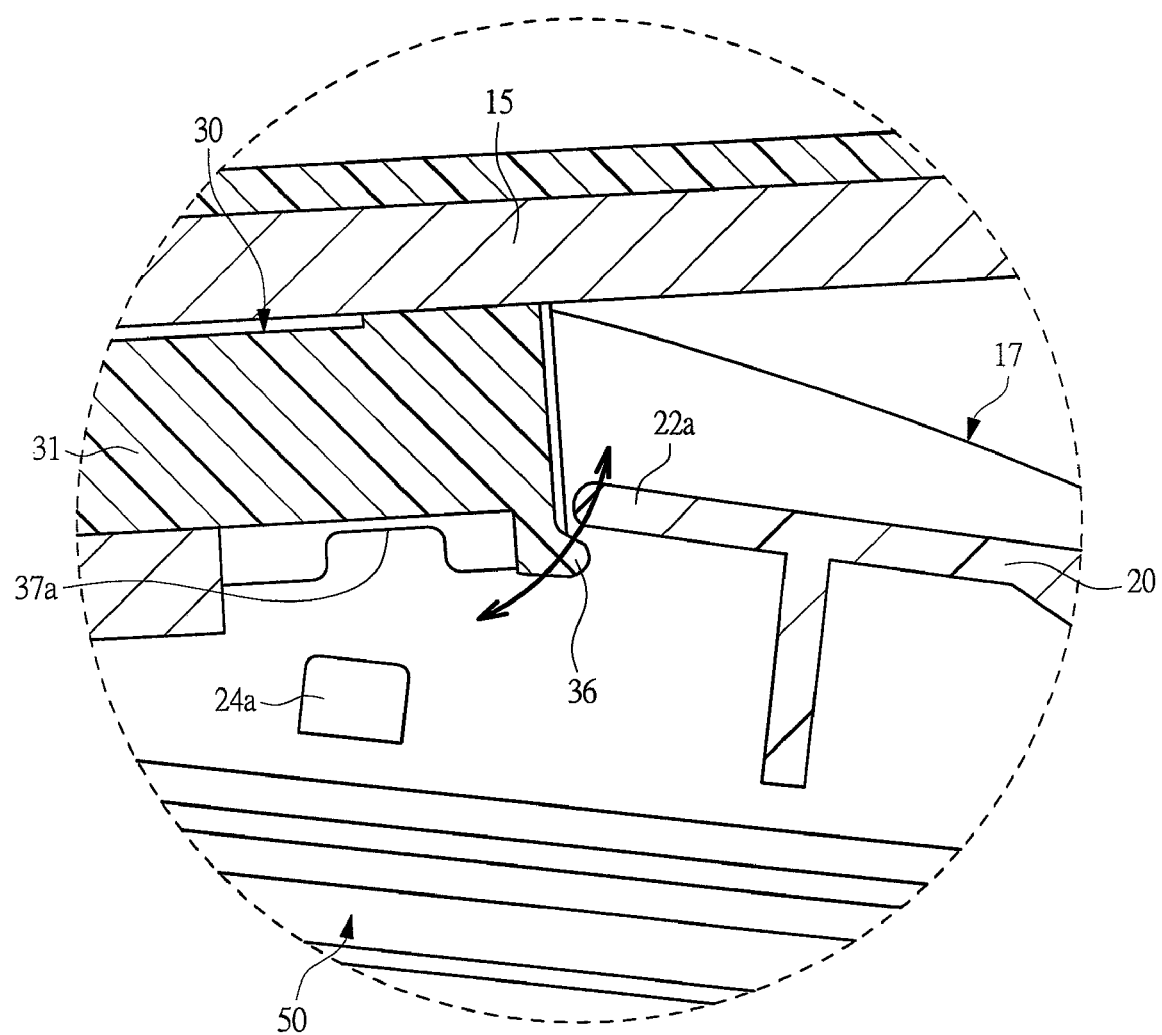
FIG. 13 is a partially enlarged cross-sectional view for explaining a modification example of a rotation regulating member according to the first embodiment.

Needless to say, the present invention is not limited to the above respective embodiments, and may be variously modified and altered within a scope of not departing from the gist thereof. For example, the first embodiment mentioned above shows a structure in which the engagement of the engaging protrusion 36 and the bridging portion 22*a* admits the further rotation of the wiper blade 17 to be regulated with respect to the wiper arm 15. However, the present invention is not limited to this. FIG. 13 shows a partial enlarged cross-sectional view for explaining a modification example of the rotation regulating member in the first embodiment, and the engaging protrusion 36 may be formed as shown in FIG. 13.

That is, when the distal side (side of the main body portion 31) of the engaging protrusion 36 is formed relatively thin and the engaging protrusion 36 is formed so as to be elastically deformable in the arrow direction of FIG. 13 in the same manner as that in the second embodiment, if a stress with a predetermined strength or more is applied to the tip side of the wiper blade 17, the present invention may have such a structure that the engagement of the engaging protrusion 36 and the bridging portion 22*a* can be released. In this case, when the stress sufficiently large to damage the engaging protrusion 36 and the bridging portion 22*a* is applied, the wiper blade 17 may be rotated with respect to the wiper arm 15 at or beyond the predetermined angle so that the damage to the wiper blade 17 can be prevented. However, even if the engaging protrusion 36 is not formed so as to be elastically deformable, the bridging portion 22*a* may be formed so as to be elastically deformable in the same manner as that in the third embodiment, or both of the engaging protrusion 36 and the bridging portion 22*a* may be formed so as to be elastically deformable.

Further, each of the above embodiments shows a structure in which the convex portions 24*a* and 24*b* as the first engaging portions are formed in the blade holder 20 and the concave portions 37*a* and 37*b* as the second engaging portions are formed in the arm mounting member 30. However, the present invention is not limited to this, and may form slits as the first engaging portions in the blade holder 20 and form, in the arm mounting member 30, concave portions as the second engaging portions that slidably enter into the slits.

In this case, by appropriately setting length dimension of the slits, a sliding range of the concave portions, that is, a rotation range of the wiper blade 17 with respect to the wiper arm 15 can be set.

Furthermore, in each of the above embodiments, the concave portions 37*a* and 37*b* as the second engaging portions are formed in the arm mounting member 30. However, the present invention is not limited to this, and the respective concave portions 37*a* and 37*b* may be omitted. That is, a lower end portion of the arm mounting member 30 may be engaged with the convex portions 24*a* and 24*b* of the blade holder 20. In this case, each engaging portion between the lower end portion of the arm mounting member 30 and the convex portions 24*a* and 24*b* serves as a second engaging portion.

Moreover, in each of the above embodiments, the pair of convex portions 24*a* and 24*b* as the first engaging portions is formed in the blade holder 20, and the pair of concave portions 37*a* and 37*b* as the second engaging portions is formed in the arm mounting member 30. However, the present invention is not limited to this, and may omit any one of a set of the convex portion 24*a* and the concave portion 37*a* and a set of the convex portion 24*b* and the concave portion 37*b*.

Still further, in the above second and third embodiments, one of the arm-side engaging protrusion and the holder-side engaging protrusion is formed so as to be elastically deformable. However, the present invention is not limited to this, and both of the arm-side engaging protrusion and the holder-side engaging protrusion may be formed so as to be elastically deformable. At this time, flexibility of the arm-side engaging protrusion and the holder-side engaging protrusion is set so that the engaging state of the arm-side engaging protrusion and the holder-side engaging protrusion can be released by an external force with a predetermined strength or more (for example, the external force F2 shown in FIG. 10A).

Furthermore, in the above second and third embodiments, the rubber abutting portions 35*a* and 35*b* in the arm portions 32*a* and 32*b* of the arm mounting member 30 are formed so that the respective gaps S between the blade rubber 50 and the rubber abutting portions 35*a* and 35*b* are larger as the rubber abutting portions 35*a* and 35*b* are separate from the rotating pin 23 in the engaging state of the arm-side engaging protrusion and the holder-side engaging protrusion, whereby the area of the portion at which the rubber abutting portions 35*a* and 35*b* abut on the blade rubber 50 is enlarged. However, the present invention is not limited to this, and a rubber abutting portion with a relatively small area may be formed at each of the arm portions 32*a* and 32*b* of the arm mounting member 30 so as to partially abut on the blade rubber 50.

Moreover, in each of the above embodiments, the wiper blade is applied to the wiper apparatus for wiping the front glass as a windshield. However, the present invention is not limited to this, and may be applied also to a wiper apparatus for wiping a rear glass as a windshield.

What is claimed is:

1. A wiper blade mounted on a wiper arm swingably provided to a vehicle, and moving swingably on a windshield to wipe the windshield, the wiper blade comprising:
    a blade rubber contacting with the windshield;
    a blade holder holding the blade rubber;
    an arm mounting member rotatably mounted on a rotating shaft provided to the blade holder, the arm mounting member being mounted on the wiper arm;
    a first engaging portion formed at a portion of the blade holder opposing to the arm mounting member;
    a second engaging portion formed at a portion of the arm mounting member opposing to the blade holder;
    a third engaging portion provided to a distal side of the arm mounting member;
    a fourth engaging portion provided to the blade holder and engaged with the third engaging portion;
    a rubber abutting portion provided to the arm mounting portion so as to abut on the blade rubber in a state where the engagement of the third and fourth engaging portions is released,
    wherein engagement of the first and second engaging portions admits rotation of a tip side of the blade holder toward the windshield at or beyond a predetermined angle to be regulated with respect to the wiper arm,
    wherein at least one of the third and fourth engaging portions is formed so as to be elastically deformable, and engagement of the third and fourth engaging portions admits rotation of a distal side of the blade holder toward the windshield at or beyond the predetermined angle to be regulated with respect to the wiper arm; and
    wherein the rubber abutting portion is formed so that a gap between the blade rubber and the rubber abutting portion is larger as the rubber abutting portion is separate from the rotating shaft in a state where the third and fourth engaging portions are engaged.

2. The wiper blade according to claim 1,
    wherein the first engaging portion is formed as a convex portion protruding from the blade holder toward the arm mounting member, and the second engaging member is formed as a concave portion engaged with the convex portion.

3. The wiper blade according to claim 1,
    wherein the arm mounting member includes a rotation regulating portion for regulating the rotation of a distal side of the blade holder toward the windshield at or beyond the predetermined angle.

* * * * *